United States Patent
Kuo et al.

(10) Patent No.: US 8,384,685 B2
(45) Date of Patent: Feb. 26, 2013

(54) SWITCHABLE THREE-DIMENSIONAL DISPLAY

(75) Inventors: Ya-Ling Kuo, Taoyuan County (TW); Chia-Chun Yeh, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 153 days.

(21) Appl. No.: 12/983,330

(22) Filed: Jan. 3, 2011

(65) Prior Publication Data

US 2012/0105434 A1    May 3, 2012

(30) Foreign Application Priority Data

Oct. 28, 2010  (TW) ................................ 99137003 A

(51) Int. Cl.
*G06F 3/041* (2006.01)
(52) U.S. Cl. ........ 345/173; 345/179; 349/12; 178/18.01
(58) Field of Classification Search .......... 345/173–179; 349/56, 61, 62, 84, 96, 12; 178/18.01–18.04
See application file for complete search history.

(56) References Cited

U.S. PATENT DOCUMENTS

| 5,136,409 | A | 8/1992 | Fushimi et al. | |
|---|---|---|---|---|
| 6,473,141 | B2 | 10/2002 | Moseley et al. | |
| 7,245,430 | B2 | 7/2007 | Kobayashi et al. | |
| 7,554,120 | B2 * | 6/2009 | Ishii | 257/72 |
| 7,567,307 | B2 * | 7/2009 | Kim et al. | 349/15 |
| 2004/0041747 | A1 | 3/2004 | Uehara et al. | |
| 2006/0082702 | A1 * | 4/2006 | Jacobs et al. | 349/96 |
| 2007/0296911 | A1 | 12/2007 | Hong | |
| 2009/0185088 | A1 | 7/2009 | Shinohara | |

FOREIGN PATENT DOCUMENTS

| CN | 101576667 | 11/2009 |
|---|---|---|
| CN | 101630493 | 1/2010 |

OTHER PUBLICATIONS

"First Office Action of China Counterpart Application", issued on Nov. 23, 2011, p. 1-p. 5.

* cited by examiner

*Primary Examiner* — Kimnhung Nguyen
(74) *Attorney, Agent, or Firm* — Jianq Chyun IP Office

(57) ABSTRACT

A switchable three-dimensional display includes a display panel and a switchable parallax barrier. The switchable parallax barrier is configured over the display panel and includes a first substrate, a second substrate, an insulating layer, a common electrode, and a light-valve layer. The first substrate has a touch-sensing circuit. The second substrate has a plurality of control electrodes and is configured between the first substrate and the display panel. The touch-sensing circuit and the control electrodes are located between the first substrate and the second substrate. The insulating layer is configured over the first substrate and covers the touch-sensing circuit. The common electrode is configured on the insulating layer. The light-valve layer is configured between the common electrode and the control electrodes.

10 Claims, 3 Drawing Sheets

SWITCHABLE THREE-DIMENSIONAL DISPLAY

CROSS-REFERENCE TO RELATED APPLICATION

This application claims the priority benefit of Taiwan application serial no. 99137003, filed on Oct. 28, 2010. The entirety the above-mentioned patent application is hereby incorporated by reference herein and made a part of specification.

BACKGROUND OF THE INVENTION

1. Field of the Invention

The invention relates to a switchable three-dimensional (3D) display. More particularly, the invention relates to a switchable 3D display in which a touch-sensing circuit is integrated into a switchable parallax barrier.

2. Description of Related Art

In recent years, as display technology advances, users have become more and more demanding on display quality of displays, such as image resolution, color saturation, and so on. However, other than the requirements for high resolution and high color saturation, in order to satisfy the need of the users to view realistic images, displays which are capable of displaying 3D images have been developed. Additionally, the displays with the touch-sensing functions have gain popularity among users.

In current 3D image display technologies, a parallax barrier controlling images captured in respective eyes of a viewer is configured between a display panel and the viewer. According to visual characteristics of human eyes, a 3D image may be produced when two images with almost the same content but different parallax are respectively captured by a viewer's left and right eyes. Said parallax barrier often has a plurality of slits that allow the viewer to see different images respectively from his or her left eye and right eye. The 3D display cannot display normal 2D images because the parallax barrier is configured between the display panel and users. Hence, a switchable parallax barrier has been proposed. When the switchable parallax barrier is disabled or turned-off, the 3D display is capable of displaying 2D images, and when the switchable parallax barrier is enabled or turned-on, the 3D display is capable of displaying 3D images.

According to the related art, the switchable parallax barrier and the touch-sensing panel are individually fabricated and adhered to the display panel. Besides, the switchable parallax barrier and the touch-sensing panel are often electrically connected to a control circuit board respectively through two flexible printed circuits. Hence, the assembly of the conventional 3D display is complicated and time-consuming, thus increasing the manufacturing costs. Moreover, the entire thickness of the conventional 3D display cannot be effectively reduced.

SUMMARY OF THE INVENTION

The invention is directed to a switchable 3D display in which a touch-sensing circuit is integrated into a switchable parallax barrier.

The invention provides a switchable 3D display that includes a display panel and a switchable parallax barrier. The switchable parallax barrier is configured over the display panel and includes a first substrate, a second substrate, an insulating layer, a common electrode, and a light-valve layer. The first substrate has a touch-sensing circuit. The second substrate has a plurality of control electrodes and is configured between the first substrate and the display panel. The touch-sensing circuit and the control electrodes are located between the first substrate and the second substrate. The insulating layer is configured over the first substrate and covers the touch-sensing circuit. The common electrode is configured on the insulating layer. The light-valve layer is configured between the common electrode and the control electrodes.

The touch-sensing circuit is integrated into the switchable parallax barrier in this invention, which contributes to mass production of the switchable 3D display and reduction of the entire thickness and weight of the switchable 3D display of the invention.

To make the above and other features and advantages of the invention more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
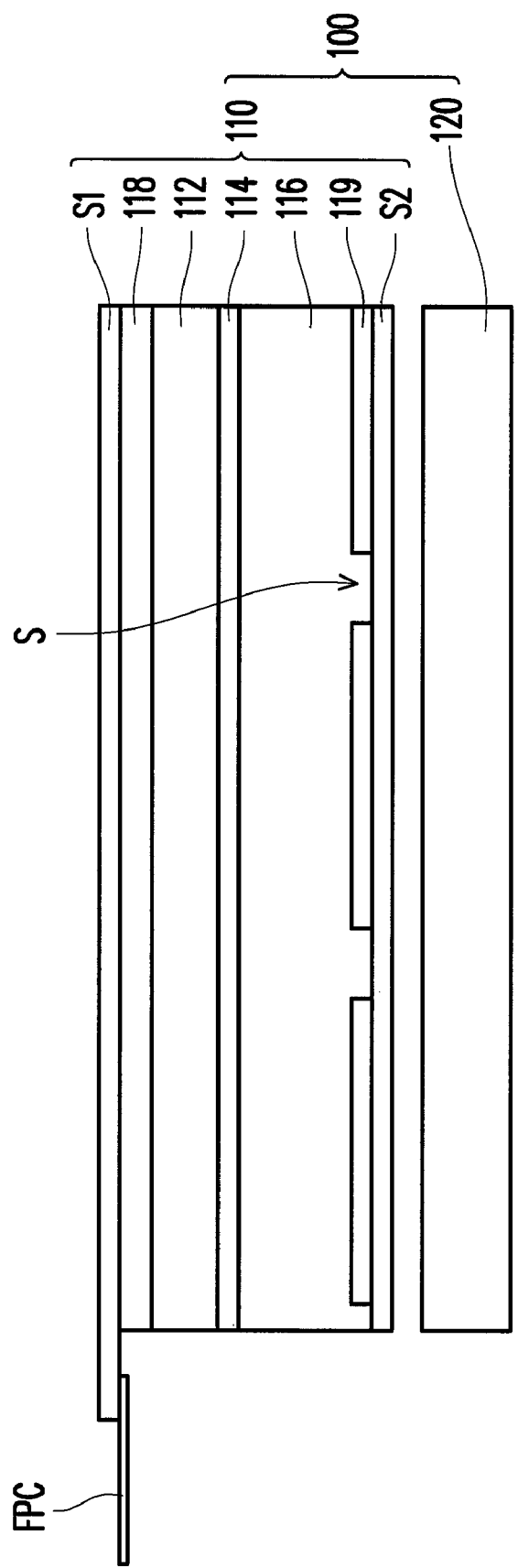
FIG. 1 is a schematic cross-sectional view illustrating a switchable 3D display according to an embodiment of the invention.

FIG. 1 is a schematic cross-sectional view illustrating a switchable 3D display according to an embodiment of the invention. With reference to FIG. 1, the switchable 3D display 100 of this embodiment includes a switchable parallax barrier 110 and a display panel 120. The switchable parallax barrier 110 is configured over the display panel 120. The switchable parallax barrier 110 includes a first substrate S1, a second substrate S2, an insulating layer 112, a common electrode 114, and a light-valve layer 116. The first substrate S1 has a touch-sensing circuit 118. The second substrate S2 has a plurality of control electrodes 119 and is configured between the first substrate S1 and the display panel 120. The touch-sensing circuit 118 and the control electrodes 119 are located between the first substrate S1 and the second substrate S2. The insulating layer 112 is configured over the first substrate S1 to cover the touch-sensing circuit 118. The common electrode 114 is configured on the insulating layer 112. The light-valve layer 116 is configured between the common electrode 114 and the control electrodes 119. Namely, the common electrode 114 is located between the insulating layer 112 and the light-valve layer 116.

The display panel 120 of this embodiment can be any type of flat display panel, such as a liquid crystal display (LCD) panel, an organic electro-luminescent display panel, a plasma display panel, an electrophoretic display panel, and so on. In most cases, the LCD panel can achieve favorable display performance when an appropriate backlight unit is applied.

It is clearly shown in FIG. 1 that the insulating layer 112 is located between the common electrode 114 and the touch-sensing circuit 118, so as to ensure that abnormal short circuit does not exist between the common electrode 114 and the touch-sensing circuit 118. In addition, based on the electrical field applied between the common electrode 114 and the control electrodes 119, the light-valve layer 116 located between the common electrode 114 and the control electrodes 119 can have different transmittances in partial regions of the light-valve layer 116. In this embodiment, the light-valve layer 116 is a liquid crystal layer, and the control electrodes 119 are a plurality of bar-shaped electrodes parallel to one another, for instance. The control electrodes 119 define a plurality of slits S parallel to one another, and the width of the slits S and the pitch between the slits S can be appropriately modified based on the distance between pixels on the display panel 120.

When the common electrode 114 is coupled to a common voltage (e.g., electrically coupled to a direct current voltage or electrically grounded), and each of the control electrodes 119 is coupled to a control signal, the transmittance of the light-valve layer 116 above the control electrodes 119 can be significantly reduced because of the voltage difference between the common electrode 114 and the control electrodes 119 (the transmittance approaches zero). Here, the images displayed on the display panel 120 can be merely seen by a viewer through the slits S, and the images seen by the viewer are the 3D images. The light-valve layer 116 can be made of a normally white liquid crystal, for instance. When the switchable parallax barrier 110 is not switched on, i.e., there is no voltage difference between the common electrode 114 and the control electrodes 119, the images displayed on the display panel 120 can successfully pass through the light-valve layer 116, so as to achieve the 2D display effect. Apparently, the light-valve layer 116 made of the normally white liquid crystal gives rise to power consumption. However, the light-valve layer 116 is not limited to be made of the normally white liquid crystal in this invention. The material of the light-valve layer 116 can be determined based on the design requirements for products.

As indicated in FIG. 1, the touch-sensing circuit 118, the insulating layer 112, and the common electrode 114 are formed on an inner surface of the first substrate S1, the control electrodes 119 are formed on an inner surface of the second substrate S2, and the space between the first substrate S1 and the second substrate S2 is filled with the light-valve layer 116 (e.g., the liquid crystal layer) after the first substrate S1 and the second substrate S2 are assembled. The fabrication of the switchable parallax barrier 110 having the touch-sensing circuit 118 requires two substrates (i.e., the first and the second substrates S1 and S2). Therefore, the entire thickness and the manufacturing costs of the switchable parallax barrier 110 can be further reduced.

Figure 2:
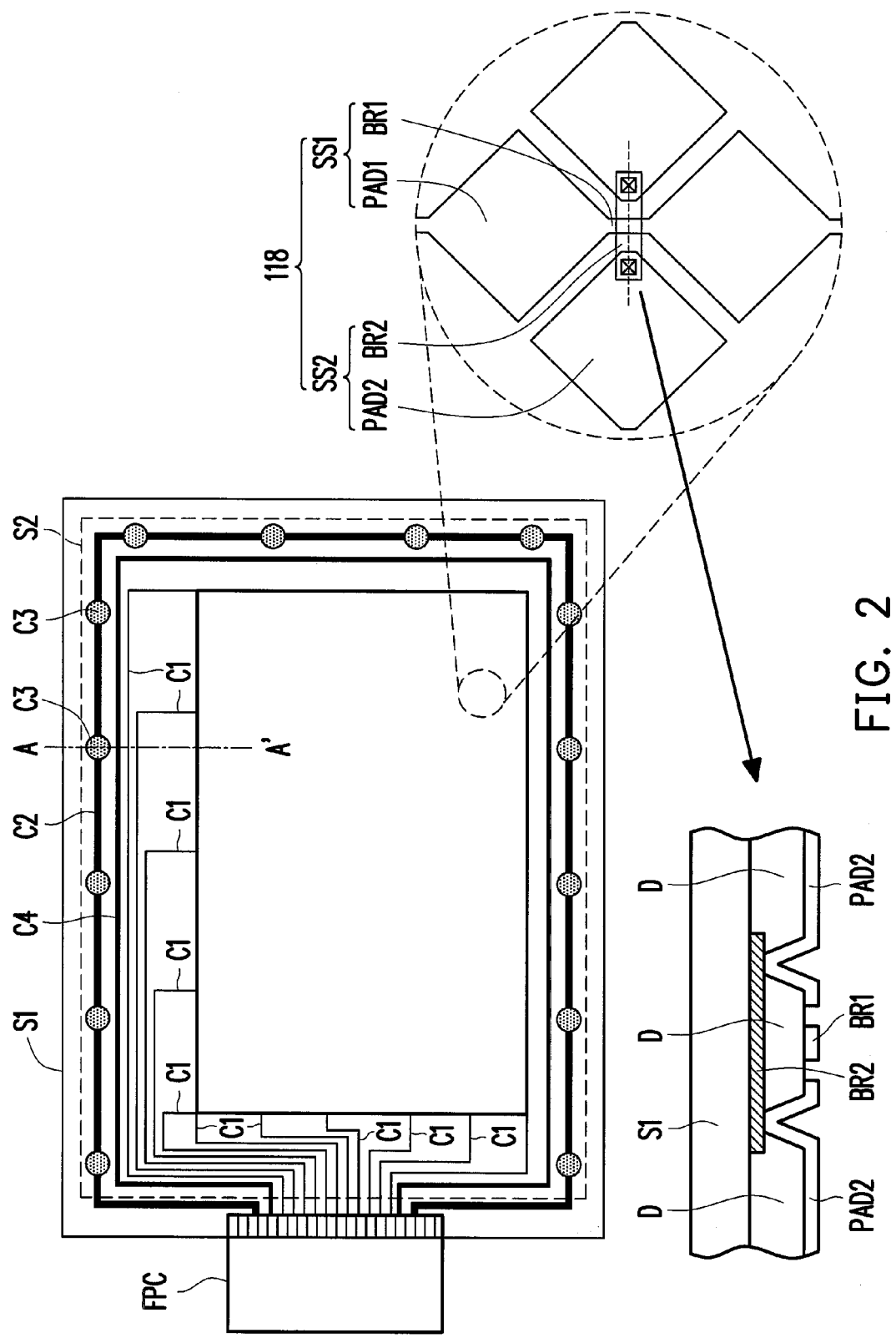
FIG. 2 is a schematic top view illustrating a switchable parallax barrier.
Figure 3:
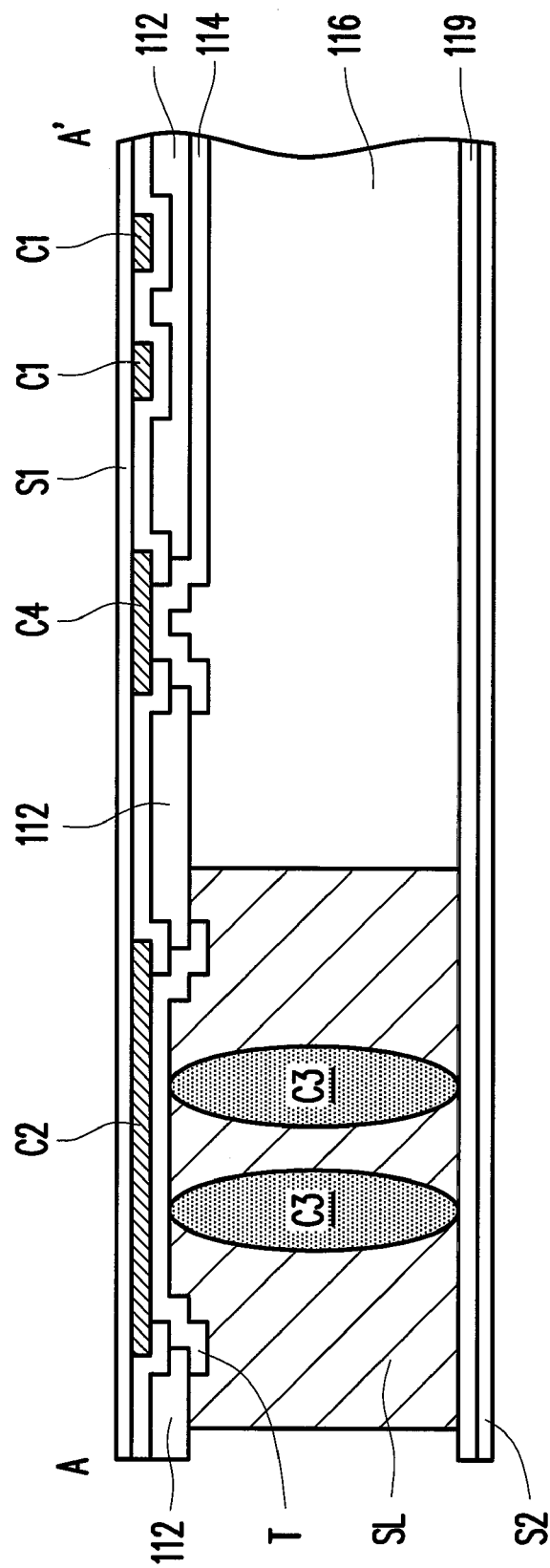
FIG. 3 is a schematic cross-sectional view taken along a cross-section A-A' depicted in FIG. 2.

FIG. 2 is a schematic top view illustrating a switchable parallax barrier. FIG. 3 is a schematic cross-sectional view taken along a cross-section A-A' depicted in FIG. 2. With reference to FIG. 2 and FIG. 3, the touch-sensing circuit 118 of this embodiment is a capacitive touch-sensing circuit, for instance. Besides, the touch-sensing circuit 118 is constituted by a plurality of first sensing series SS1 electrically insulated from one another and a plurality of second sensing series SS2 electrically insulated from one another. First sensing pads PAD1 and first bridge lines BR1 in the first sensing series SS1 and second sensing pads PAD2 in the second sensing series SS2 can be formed by a patterned transparent conductive layer, for instance. Second bridge lines BR2 connected to the adjacent second sensing pads PAD2 in the second sensing series SS2 are metal bridge lines with satisfactory electrical conductivity, for instance. The second bridge lines BR2 and the first bridge lines BR1 are electrically insulated at the intersections of the first and the second bridge lines BR1 and BR2 because a dielectric material D is disposed therebetween. In addition, the second bridge lines BR2 can be formed before or after the patterned transparent conductive layer is formed, which is not limited in the invention. According to other embodiments of the invention, the first sensing series can be formed by a patterned transparent conductive layer, and the second sensing series can be formed by another patterned transparent conductive layer. The first and the second sensing series are electrically insulated at the intersections of the two sensing series because the dielectric material is disposed therebetween. The type of the touch-sensing circuit 118 and a method of forming the same are not limited in the invention.

It can be learned from FIG. 2 and FIG. 3 that the touch-sensing circuit 118 on the first substrate S1 not only includes the first and the second sensing series SS1 and SS2 but also includes a plurality of touch-sensing signal transmission circuits C1. Each of the touch-sensing signal transmission circuits C1 is connected to the corresponding first sensing series SS1 or the corresponding second sensing series SS2, so as to transmit touch-sensing signals to the control circuit board or other control units. The first substrate S1 can further include at least one control signal transmission wiring C2, and the switchable parallax barrier 110 can further include at least one conductive element C3. The conductive element C3 is configured between the first substrate S1 and the second substrate S2, and the control electrodes 119 are electrically connected to the control signal transmission wiring C2 through the conductive element C3. For instance, the conductive element C3 can be an Au ball, a ball-shaped element made of other materials, or a conductive post made of any material as long as the Au ball, the ball-shaped element, or the conductive post has favorable electrical conductivity. In other embodiments of the invention, the conductive element C3 is electrically connected to the control signal transmission wiring C2 through a transfer pad T. The transfer pad T and the common electrode 114, for example, are made of the same material, such as indium tin oxide, indium zinc oxide, or other transparent conductive materials. In addition, the transfer pad T is formed at the same time with the common electrode 114, for instance.

To ensure the electrical connection among the control electrodes 119, the conductive element C3, and the control signal transmission wiring C2, a sealant SL can be configured between the first substrate S1 and the second substrate S2. The sealant SL not only can encapsulate the conductive element C3 but also can surround the light-valve layer 116, such that the light-valve layer 116 is sealed between the first substrate S1 and the second substrate S2.

In view of the above, the common electrode 114 can be connected to a conductive circuit C4 formed on the second substrate S2 through at least one contact window. Note that the touch-sensing signal transmission circuits C1, the control signal transmission wiring C2, and the conductive circuit C4 can be formed at the same time with a conductive thin film in the touch-sensing circuit 118. Specifically, the touch-sensing signal transmission circuits C1, the control signal transmission wiring C2, and the conductive circuit C4 are formed at the same time with the second bridge lines BR2, for instance.

As clearly shown in FIG. 1 and FIG. 2, the touch-sensing signal transmission circuits C1, the control signal transmission wiring C2, and the conductive circuit C4 in this embodiment are converged at the edge of the first substrate S1 and electrically connected to the flat printed circuit FPC. Apparently, the switchable parallax barrier 110 of this embodiment can be electrically connected to the control circuit board or other control units through one flat printed circuit FPC. Hence, the assembly of the switchable parallax barrier 110 is rather simple and fast.

The touch-sensing circuit is integrated into the switchable parallax barrier in this invention, which contributes to mass production of the switchable 3D display and reduction of the entire thickness and weight of the switchable 3D display of the invention.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A switchable three dimensional display comprising:
a display panel; and
a switchable parallax barrier configured over the display panel and comprising:
   a first substrate having a touch-sensing circuit;
   a second substrate configured between the first substrate and the display panel, the second substrate having a plurality of control electrodes, the touch-sensing circuit and the control electrodes being located between the first substrate and the second substrate;
   an insulating layer configured over the first substrate and covering the touch-sensing circuit;
   a common electrode configured on the insulating layer; and
   a light-valve layer configured between the common electrode and the control electrodes.

2. The switchable three-dimensional display as claimed in claim 1, wherein the display panel comprises a liquid crystal display panel, an organic electro-luminescent display panel, a plasma display panel, or an electrophoretic display panel.

3. The switchable three-dimensional display as claimed in claim 1, wherein the control electrodes define a plurality of slits parallel to one another.

4. The switchable three-dimensional display as claimed in claim 1, wherein the first substrate further comprises at least one control signal transmission wiring, the switchable parallax barrier further comprises at least one conductive element configured between the first substrate and the second substrate, and the control electrodes are electrically connected to the at least one control signal transmission wiring through the at least one conductive element.

5. The switchable three-dimensional display as claimed in claim 4, wherein the switchable parallax barrier further comprises a sealant configured between the first substrate and the second substrate and surrounding the light-valve layer.

6. The switchable three-dimensional display as claimed in claim 5, wherein the at least one conductive element is encapsulated by the sealant.

7. The switchable three-dimensional display as claimed in claim 1, wherein the light-valve layer comprises a liquid crystal layer.

8. The switchable three-dimensional display as claimed in claim 1, wherein the common electrode is grounded.

9. The switchable three-dimensional display as claimed in claim 1, wherein the common electrode is located between the insulating layer and the light-valve layer.

10. The switchable three-dimensional display as claimed in claim 1, wherein the insulating layer is located between the common electrode and the touch-sensing circuit.

* * * * *